(12) United States Patent
Tamura et al.

(10) Patent No.: US 7,673,536 B2
(45) Date of Patent: Mar. 9, 2010

(54) INDUSTRIAL ROBOT

(75) Inventors: Toshinari Tamura, Gotenba (JP);
Hidenori Kurebayashi, Yamanashi (JP);
Yasuyoshi Tanaka, Yamanashi (JP)

(73) Assignee: Fanuc Ltd, Minamitsuru-gun, Yamanashi (JP)

(*) Notice: Subject to any disclaimer, the term of this patent is extended or adjusted under 35 U.S.C. 154(b) by 174 days.

(21) Appl. No.: 11/889,476

(22) Filed: Aug. 14, 2007

(65) Prior Publication Data
US 2008/0056858 A1   Mar. 6, 2008

(30) Foreign Application Priority Data
Aug. 31, 2006   (JP)   ............... 2006-235393

(51) Int. Cl.
*B25J 17/00*   (2006.01)
(52) U.S. Cl. ............... 74/490.01; 901/23; 700/245; 318/568.1
(58) Field of Classification Search ............... 74/490.01, 74/490.03; 414/744.5; 901/23, 24; 318/568.1, 318/568.2; 700/245
See application file for complete search history.

(56) References Cited

U.S. PATENT DOCUMENTS

| 5,646,495 | A | 7/1997 | Toyozawa et al. | |
| 6,389,921 | B1* | 5/2002 | Nada | ............... 74/490.02 |
| 6,477,913 | B1 | 11/2002 | Akeel et al. | |
| 7,201,078 | B2* | 4/2007 | Byun | ............... 74/490.03 |
| 2002/0078778 | A1* | 6/2002 | Grover et al. | ............... 74/490.03 |

| 2003/0192400 | A1* | 10/2003 | Cordeiro | ............... 74/665 A |
| 2004/0169484 | A1* | 9/2004 | Iribe et al. | ............... 318/568.11 |
| 2007/0210738 | A1* | 9/2007 | Khatib et al. | ............... 318/568.2 |
| 2007/0216333 | A1* | 9/2007 | Hagihara | ............... 318/568.2 |

FOREIGN PATENT DOCUMENTS

| EP | 0 105 656 | | 4/1984 |
| EP | 1 143 315 | A2 | 10/2001 |
| EP | 1 352 720 | A1 | 10/2003 |
| JP | 59-64286 | | 4/1984 |
| JP | 59-133857 | | 9/1984 |
| JP | 60-80578 | | 5/1985 |
| JP | 61-33884 | | 2/1986 |
| JP | 61-151883 | | 9/1986 |
| JP | 08-16246 | | 1/1996 |

(Continued)

OTHER PUBLICATIONS

European Search Report mailed Dec. 6, 2007 issued in EP Application No. 07015965.2.
Japanese Notice of Reasons for Rejection mailed Jun. 24, 2008 issued in Japanese Application No. 2006-235393 (including a partial translation thereof).

(Continued)

*Primary Examiner*—David M Fenstermacher
(74) *Attorney, Agent, or Firm*—Drinker Biddle & Reath LLP (57) ABSTRACT

An industrial robot (10) comprising three power transmission units (21, 22, 23) arranged concentrically and three drive means for driving the three power transmission units, respectively, is disclosed. The drive means for at least one of the three power transmission units includes two motors (31, 34). Also, all of the three power transmission units and the three drive means are desirably built into the base (15) of the industrial robot. This configuration makes it possible to have high-duty operation with a comparatively compact structure.

5 Claims, 7 Drawing Sheets

FOREIGN PATENT DOCUMENTS

| | | |
|---|---|---|
| JP | 2000-69782 | 3/2000 |
| JP | 2001-273037 | 10/2001 |
| JP | 2002-73175 | 3/2002 |

OTHER PUBLICATIONS

Japanese Notice of Reasons for Rejection mailed Feb. 3, 2009 issued in Japanese Application No. 2006-235393 (including a partial translation thereof).

* cited by examiner

INDUSTRIAL ROBOT

This application claims priority under 35 U.S.C. §119 and/or §365 to Japanese Application No. 2006-235393, filed on Aug. 31, 2006, the entire contents of which are incorporated herein by reference.

BACKGROUND OF THE INVENTION

1. Field of the Invention

This invention relates to an industrial robot, or in particular to an industrial robot required to operate at high speed for a long period of time.

2. Description of the Related Art

Figure 7:
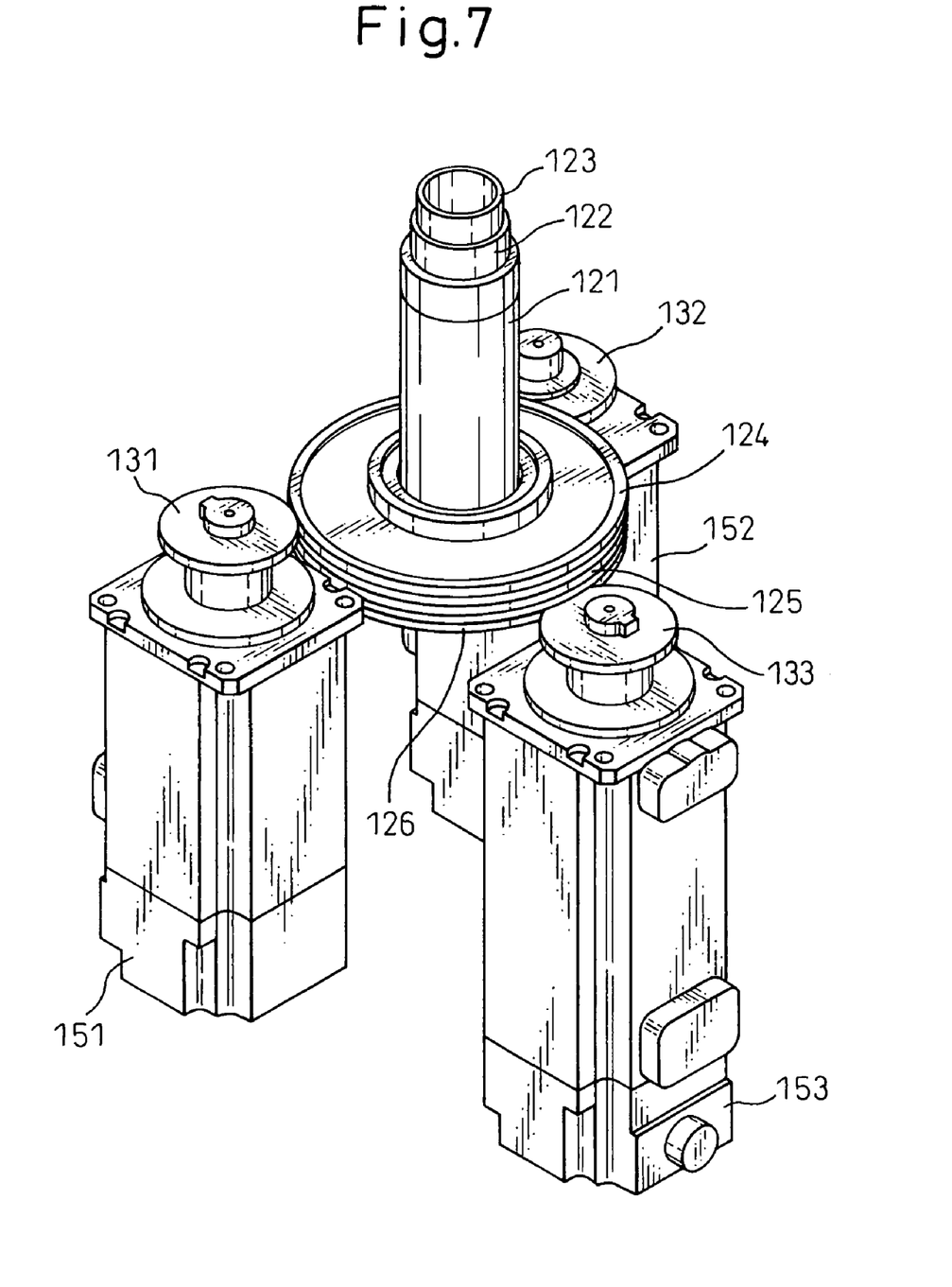
FIG. 7 is a perspective view of the three power transmission units of the conventional industrial robot.

FIG. 7 is a perspective view showing three power transmission units of a conventional industrial robot. As shown in FIG. 7, power transmission gears 124, 125, 126 are arranged in that order coaxially on three power transmission units 121, 122, 123, respectively, arranged concentrically with each other. The three power transmission gears 124, 125, 126 are engaged by motor gears 131, 132, 133 of motors 151, 152, 153, respectively. The motors 151, 152, 153 have the same rating. As can be seen from FIG. 7, the motor gears 131, 132, 133 are arranged substantially equidistantly along the periphery of the power transmission gears 124, 125, 126.

Japanese Unexamined Patent Publication No. 2001-273037 discloses a servo control system for driving a single movable member with two motors. The position control device of the servo control system includes, for each motor, a position controller for receiving the same position command from a host control unit and processing the position deviation amount equal to the position command less the position feedback amount from the position detector thereby to output a speed command, a speed controller for receiving the speed command and processing the speed deviation amount equal to the speed command less the speed feedback amount from the speed detector thereby to output a current command, and a current controller for receiving the current command and processing the current deviation amount equal to the current command from which the current feedback amount from a sensor for detecting the motor current is subtracted, to thereby output a voltage command and activate the current amplifier in accordance with the voltage command.

In recent years, a robot has been required to be operated at high speed, and especially, in order to improve production efficiency, an increased transport ability of the robot is also required. With regard to transport ability, in addition to the high speed and high acceleration of the robot arm operation, the robot is expected to perform severe operations continuously, namely it is expected to realize operations at a high duty factor.

In the case where it is desirable to improve an operation performance of the servo control unit, the rating of the motors is usually increased. An increased motor rating, however, increases both the motor size and the rotor inertia of the motor. Further, increased motor size increases the size of transmission elements related to the motor output shaft, such as gears, resulting in increased inertia.

It is necessary for the motor to bear torque increased by the increased rotor inertia of the motor and by the increased inertia of the transmission elements is required. Even in the case where the motor rating is increased, the almost all the output of the increased motor rating is used for the torque increased by the increase of rotor inertia of the motor and the inertia of the transmission elements. This poses a problem in which it is difficult to increase the acceleration of the driving the motor output shaft. Also, by decreasing the weight of the arm, it may be possible to reduce the load. However, there is a limit to such a solution.

This invention has been achieved in view of the above, and the object thereof is to provide an industrial robot capable of high-duty operation with a comparatively compact configuration.

SUMMARY OF THE INVENTION

In order to achieve the aforementioned object, according to a first aspect of the invention, there is provided an industrial robot comprising a wrist axial portion, three basic axial portions for positioning the wrist axial portion in a three-dimensional space and three drive means for driving the three basic axial portions, respectively, wherein all of the motors included in the three drive means are built into the base of the industrial robot, and the drive means corresponding to at least one of the three basic axial portions includes at least two motors.

Specifically, in the first aspect of the invention, if one basic axial portion is driven by two motors, rotor inertia is doubled in the presence of the two motors. Nevertheless, the load bore by each motor is reduced to one half, and therefore, the basic axial portions can be driven with a margin of torque capacity. Further, since a single basic axial portion is driven by at least two motors, it is not necessary to stop the operation even at high speed and high acceleration, which in turn makes continuous operation possible with a high duty factor. Also, in view of the fact that all of the motors included in the three drive means are built into the base of the industrial robot, a comparatively compact industrial robot can be realized, compared with a case in which the motor is arranged on the upper arm of the industrial robot, it is possible to avoid the situation in which the motor itself is a load.

According to a second aspect of the invention, there is provided an industrial robot as in the first aspect of the invention, wherein each of the three drive means includes at least two motors.

Specifically, in the second aspect of the invention, the industrial robot does not include a basic axial portion driven by a single motor, and therefore, it is not possible to reduce the operation performance in order to correspond to the basic axial portion, duty performance thereof is low. In all of the directions of the spatial XYZ coordinate, high-speed, high-acceleration operation is made possible.

According to a third aspect of the invention, there is provided an industrial robot as in the first or second aspect of the invention, wherein the three basic axial portions have respective power transmission gears arranged sequentially and coaxially in the axial direction, and each of the motors has a motor gear for engaging with each of the power transmission gears on the output shaft of the motor wherein all the motor gears are arranged along the periphery of the power transmission gears.

Specifically, in the third aspect of the invention, if the number of motors is increased, it is possible to arrange additional motors in the space around the power transmission gears, and space for accommodating the additional motors can be easily secured.

According to a fourth aspect of the invention, there is provided an industrial robot as in the first aspect of the invention, wherein the drive means corresponding to at least one of the three basic axial portions includes first and second motors, in which the first motor is controlled in accordance with a torque command of the first motor generated based on the speed of the first motor, while the second motor is controlled in accordance with the torque command of the first motor.

Specifically, in the fourth aspect of the invention, it is possible to avoid the case in which one motor gear does not engage with the power transmission gears in the backlash between the motor gears and the power transmission gears.

According to a fifth aspect of the invention, there is provided an industrial robot as in the fourth aspect of the invention, wherein only one of the first and second motors has a mechanical brake.

Specifically, in the fifth aspect of the invention, the mechanical brake prevents the robot arm from falling axially under gravitation. In the case where each motor has a mechanical brake, an excessive load may be imposed on the power transmission gears by a time lag when each of the mechanical brakes is applied. However, it is possible to avoid this problem in this fifth aspect of the invention.

The above and other objects, features and advantages will be made more apparent by the detailed description of typical embodiments of the invention taken in conjunction with the accompanying drawings.

DETAILED DESCRIPTION

The embodiments of the invention are explained below with reference to the accompanying drawings. In the drawings, the same component members are designated by the same reference numerals, respectively. To facilitate understanding, the scale of the drawings has been appropriately changed.

Figure 1:
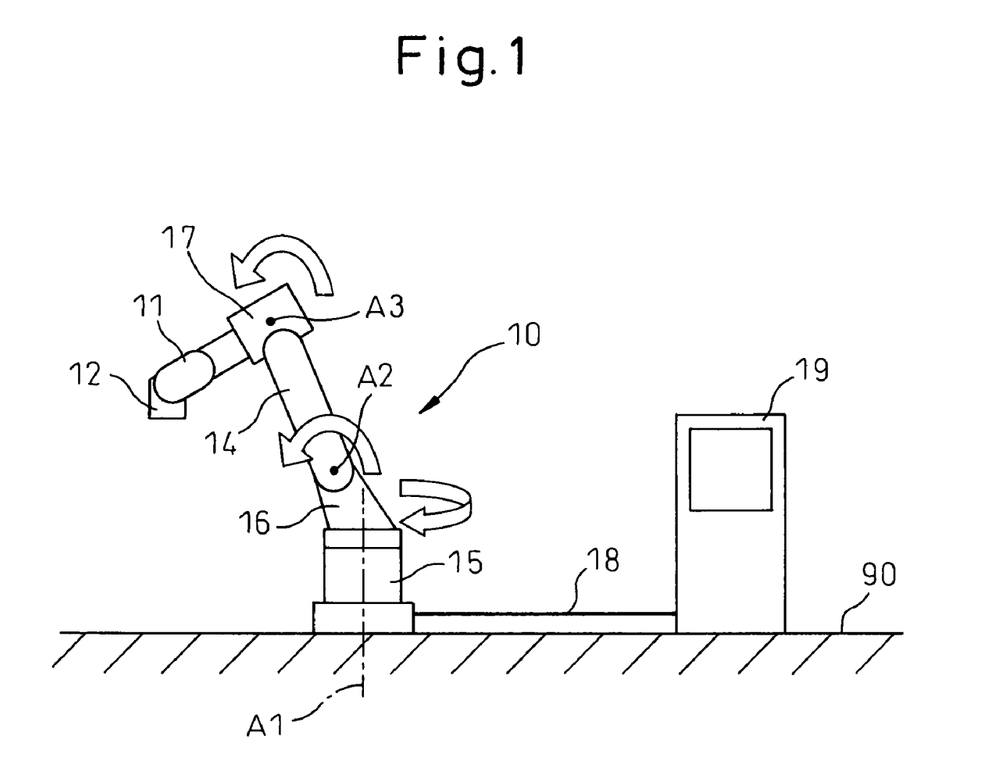
FIG. 1 is a side view of an ordinary industrial robot.

FIG. 1 is a side view of an ordinary industrial robot. As shown in FIG. 1, an industrial robot 10 includes a robot base 15 fixed to the floor 90, a turning body 16 rotatably mounted on the robot base 15, an upper arm 14 extending from the turning body 16 and a front arm base 17 mounted in the neighborhood of the upper end of the upper arm 14.

A first wrist element 11 is mounted at the forward end of the front arm base 17, and a second wrist element 12 is mounted on the first wrist element 11. A working means such as a holding hand (not shown) is mounted on the second wrist element 12. The wrist elements 11, 12 determine the posture of the working means in the space. The robot 10 is also connected to a robot control unit 19 via a line 18, and controlled by the robot control unit 19.

The industrial robot 10 shown in FIG. 1 includes three basic axial portions (three basic shafts). As shown, a first basic axis A1 is one around which the portion of the industrial robot 10 higher than the robot base 15 is rotated horizontally in the direction of the arrow with respect to the robot base 15 and the floor surface 90. A second basic axis A2 is one around which the upper arm 14 moves up and down perpendicular to the floor 90. Further, a third basic axis A3 is one around which the front arm base portion 17 is rotated in the same direction as the second basic axis A2. In other words, the wrist axes of the first and second wrist elements 11, 12 are not included in the three basic axes.

Figure 2:
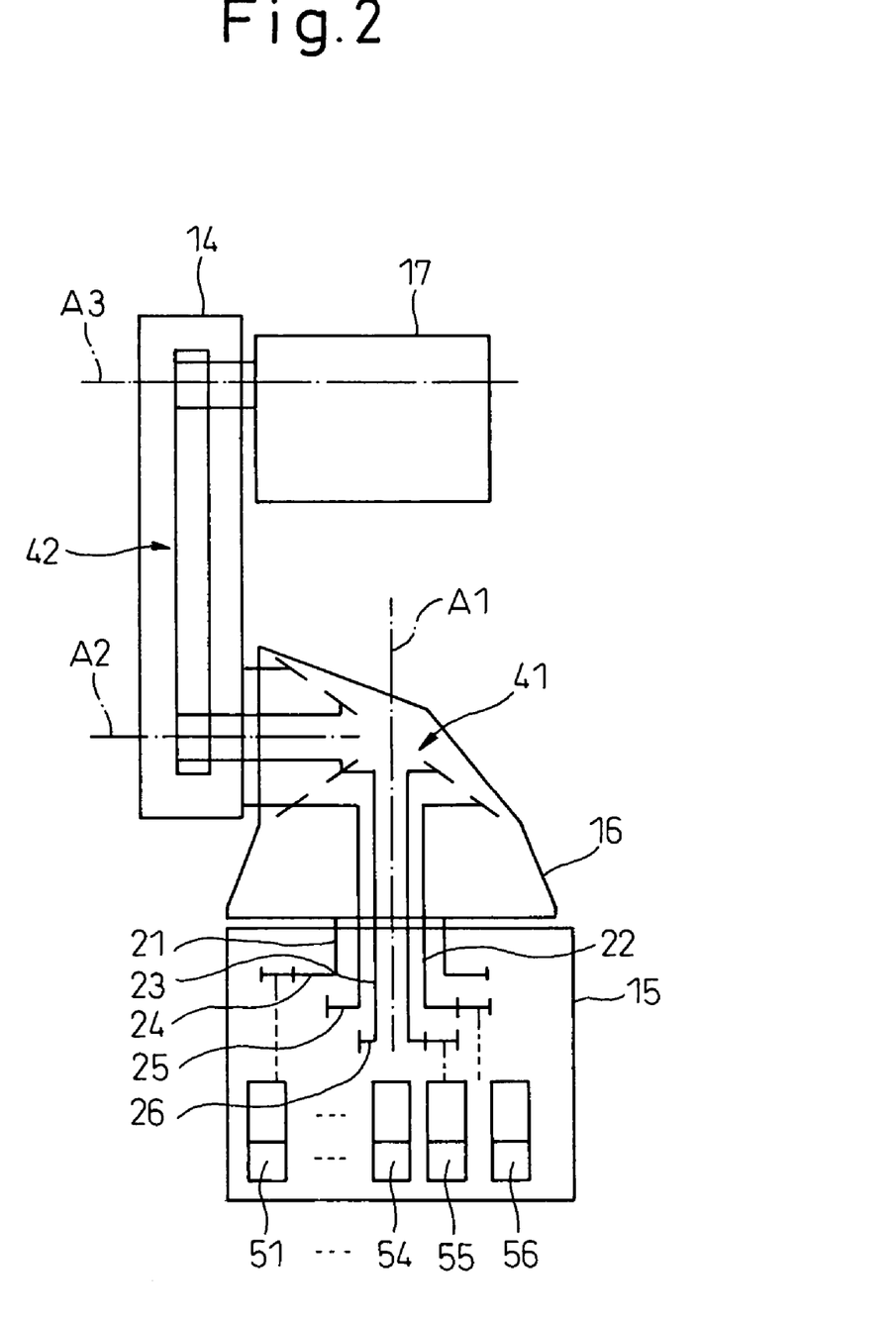
FIG. 2 is a partially enlarged view of the industrial robot shown in FIG. 1.

FIG. 2 is a partially enlarged view of the industrial robot shown in FIG. 1. As shown in FIG. 2, three power transmission units 21, 22, 23 are arranged on the robot base 15. Further, all of the motors 51 to 56 for driving the three power transmission units 21, 22, 23 are arranged in the robot base 15 of the industrial robot 10.

As shown, the turning body 16 is directly coupled to the power transmission unit 21, and with the rotation of the power transmission unit 21, adapted to rotate around the first basic axis A1. The first transmission element 41 including a helical gear is built into the turning body 16, and a part of the first transmission element 41 is directly coupled to an upper arm 14. Therefore, the turning effort of the power transmission unit 22 is transmitted to the upper arm 14 via the first transmission element 41 whereby the upper arm 14 is rotated around the second basic axis A2.

Further, as shown, the second transmission element 42 such as a belt/pulley connected to the first transmission element 41 is built in the upper arm 14. A part of the second transmission element 42 is directly coupled to the front arm base portion 17. The turning effort of the power transmission unit 23, is transmitted to the front arm base portion 17 via the first transmission element 41 and the second transmission element 42 whereby the front arm base portion 17 is rotated around the third basic axis A3. The first transmission element 41 and the second transmission element 42 may be other component elements, such as a reduction gear, a drive shaft or a chain.

As described above, according to this invention, all of the motors 51 to 56, which are comparatively heavy, are arranged inside the robot base 15. In the case where a part of the motors is arranged inside the turning body 16 and/or the upper arm 14, on the other hand, the motors would constitute their own load when the turning body 16 and/or the upper arm 14 is rotated, and motor torque is used to a degree more than necessary. According to this invention, however, none of the motors 51 to 56 are arranged inside the turning body 16 and/or the upper arm 14, and therefore, the motors make up no load when the turning body 16 and/or the upper arm 14 is rotated. Thus, no additional torque of the motors is generated.

Further, according to this invention, connecting wires (not shown) to the motors for driving the three basic axial portions are not required to be extended from the robot base 15 to the turning body 16 and/or the upper arm 14. According to the invention, the arrangement of the connecting wires is simplified, and are not twisted at the time of rotation of the turning body 16 and/or the upper arm 14, and therefore, it is possible to increase the life of the connecting wires.

Figure 3:
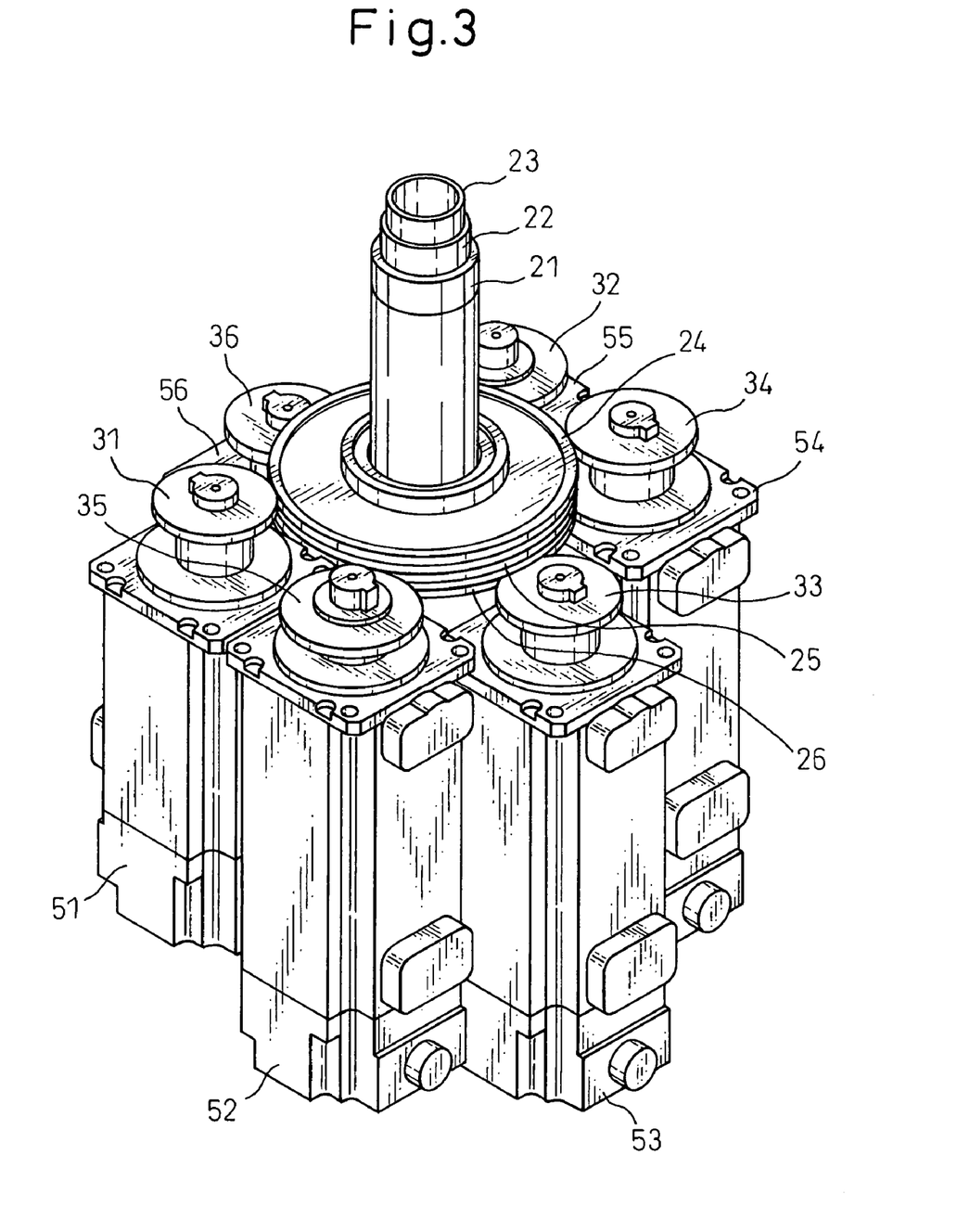
FIG. 3 is a perspective view showing the three power transmission units of the industrial robot according to the invention.
Figure 4:
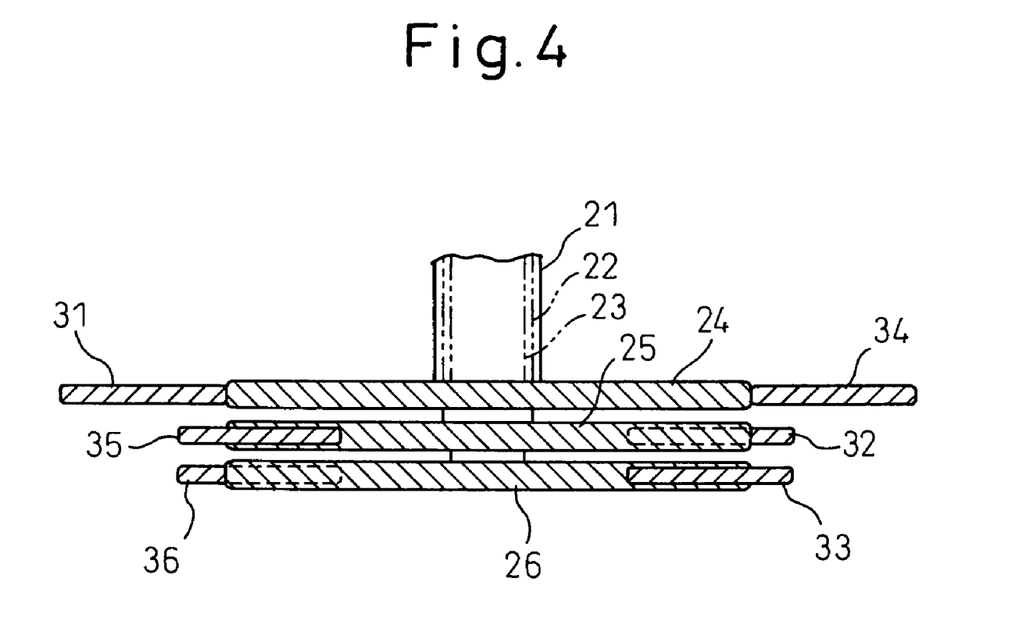
FIG. 4 is a partial side view of the three power transmission units shown in FIG. 3.

FIG. 3 is a perspective view showing the three power transmission units of the industrial robot according to the invention. FIG. 4 is a partial side view of the three power transmission units shown in FIG. 3. In FIG. 4, the motors and the output shafts of the motors are not shown for simplification.

As can be seen from FIGS. 3 and 4, the power transmission gears 24, 25, 26 are mounted at the forward ends of the power transmission units 21, 22, 23, respectively. The power transmission gears 24, 25, 26 are substantially equal in diameter to each other and mounted on the same axis in a slightly spaced relationship to each other in the axial direction. In FIG. 2, to facilitate understanding, the power transmission gears 24, 25, 26 are described in such a manner that the diameters of the power transmission gears 24, 25, 26 are different to have different diameters from each other.

As can be seen specifically from FIG. 4, the power transmission gear 24 located in the upper stage is engaged with the motor gears 31, 34 arranged opposed to each other along the diameter of the power transmission gear 24. These motor gears are mounted on the output shafts of the two motors 51, 54, respectively.

Similarly, the power transmission gear 25 located in the middle stage is engaged with the motor gears 32, 35 of the two motors 52, 55. Further, the power transmission gear 26 located in the lower stage is similarly engaged with the motor gears 33, 36 of the two motors 53, 56. The motors 51 to 56 are equal in rating to each other, and the motors 31 to 36 are equal in size to each other.

According to this invention, each power transmission gear is engaged with two motor gears. With this configuration, as compared with a case in which each power transmission unit is driven by a single motor, it is possible to drive each power transmission unit while the load imposed on each motor can be reduced to one half. According to this invention, even if an operation at high speed and at high acceleration is continuously performed, it is not necessary to stop the operation, and it is possible to perform a continuous operation with a high duty factor, for example of about 100%.

As shown in FIG. 3, the six motor gears 31 to 36 are arranged substantially equidistantly along the periphery of the power transmission gears 24, 25, 26. As can be seen from FIG. 7, three spaces are available between the motors 151, 152, 153. Further, according to this invention, as shown in FIG. 3, the additional motor gears 34 to 36 included in the six motor gears 31 to 36 and the related motors 54 to 56 thereof are arranged in the spaces between the motors 151, 152, 153.

In the case where each power transmission gear is driven by two motor gears as shown in FIG. 3, the additional motors can be arranged in the spaces, respectively. In other words, according to this invention, spaces for arranging the additional motors 34 to 36 can be easily secured.

Figure 5:
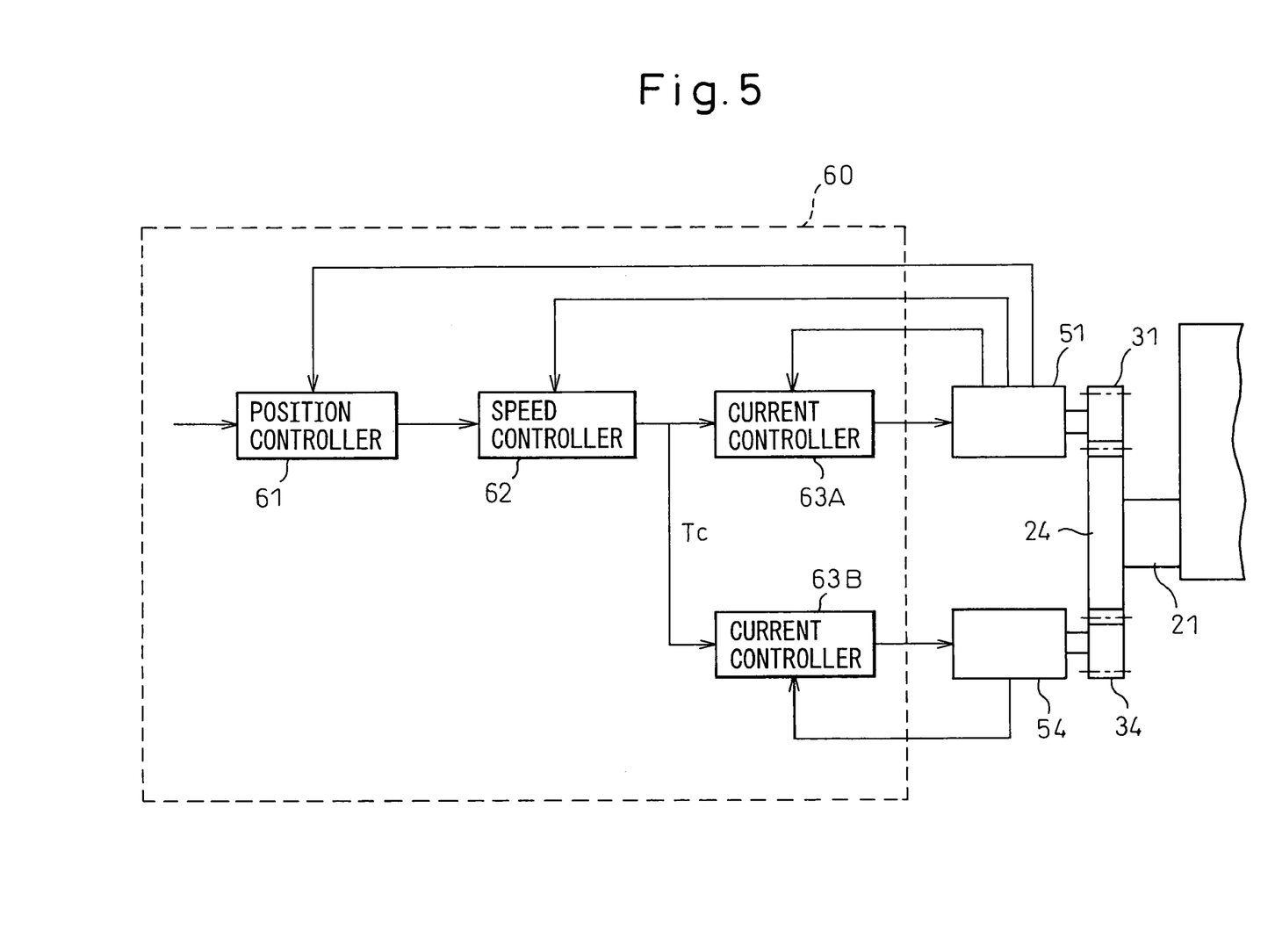
FIG. 5 is a block diagram for explaining the manner in which each power transmission gear is controlled according to the invention.

FIG. 5 is a block diagram explaining the manner in which each power transmission gear is controlled in the present invention. In FIG. 5, the power transmission gear 24 of the power transmission unit 21 constituting one of the three power transmission units is shown as a representative case.

The motor 51 is connected to a speed detector (not shown) for detecting the rotational speed of the output shaft of the motor 51 and a current detector (not shown) for detecting the current flowing in the motor 51. In a similar fashion, the motor 54 is connected to a current detector (not shown) for detecting current flowing in the motor 54.

With reference to FIG. 5, the operation for controlling the motors 51, 54 associated with the motor gears 31, 34 engaged with the power transmission gear 24 will be briefly explained. The speed of the motor 51 detected by the speed detector is integrated with respect to time and transmitted as an speed integration value (corresponding to the position of the output shaft of the motor 51) to a position controller 61.

In the position controller 61, a speed command is generated by a well-known method based on the position command value generated in the control unit 60, and the aforementioned speed integration value, and is transmitted to the speed controller 62. Then, in the speed controller 62, a torque command Tc is generated by a well-known method based on the detected speed of the motor 51 and the aforementioned speed command.

As shown, the torque command Tc is transmitted to the current controller 63A. In the current controller 63A, a current command is generated by a well-known method based on the detected current value of the motor 51 and the torque command Tc, and the motor 51 is driven in accordance with the current command Tc.

As can be seen from FIG. 5, according to this invention, the torque command Tc generated in the speed controller 62 is also transmitted to the current controller 63B for the motor 54. In the current controller 63B, a current command is generated by a well-known method based on the detected current value of the motor 54 and the torque command Tc, and the motor 54 is similarly driven in accordance with the current command.

Specifically, according to this invention, the motors 51, 54 associated with the two motor gears 31, 34 engaged with a single power transmission gear 24 are driven based on the same torque command. In other words, according to this invention, the torque tandem control based on a single torque command is performed. As a result, the motor gears 31, 34 both positively engage with the power transmission gear 24 while at the same time distribute motor output torque between the two motors 51, 54. Thus, it is possible to positively generate a situation in which the motor torque has a margin.

On the other hand, it is also possible to control the two motors 51, 54 based on the position of the output shaft of each motor, i.e. perform what is called position tandem control operation. In this case, however, only one of the two motor gears 31, 34 may engage the power transmission gear 24 in the backlash while the other motor gear fails to engage with the power transmission gear 24. Therefore, in the position tandem control operation, desired torque may not be generated.

According to this invention, therefore, it is advantageous that the torque tandem control operation described above can be performed. It will be understood that the torque tandem control operation can be similarly performed for the other power transmission gears 25, 26.

Figure 6:
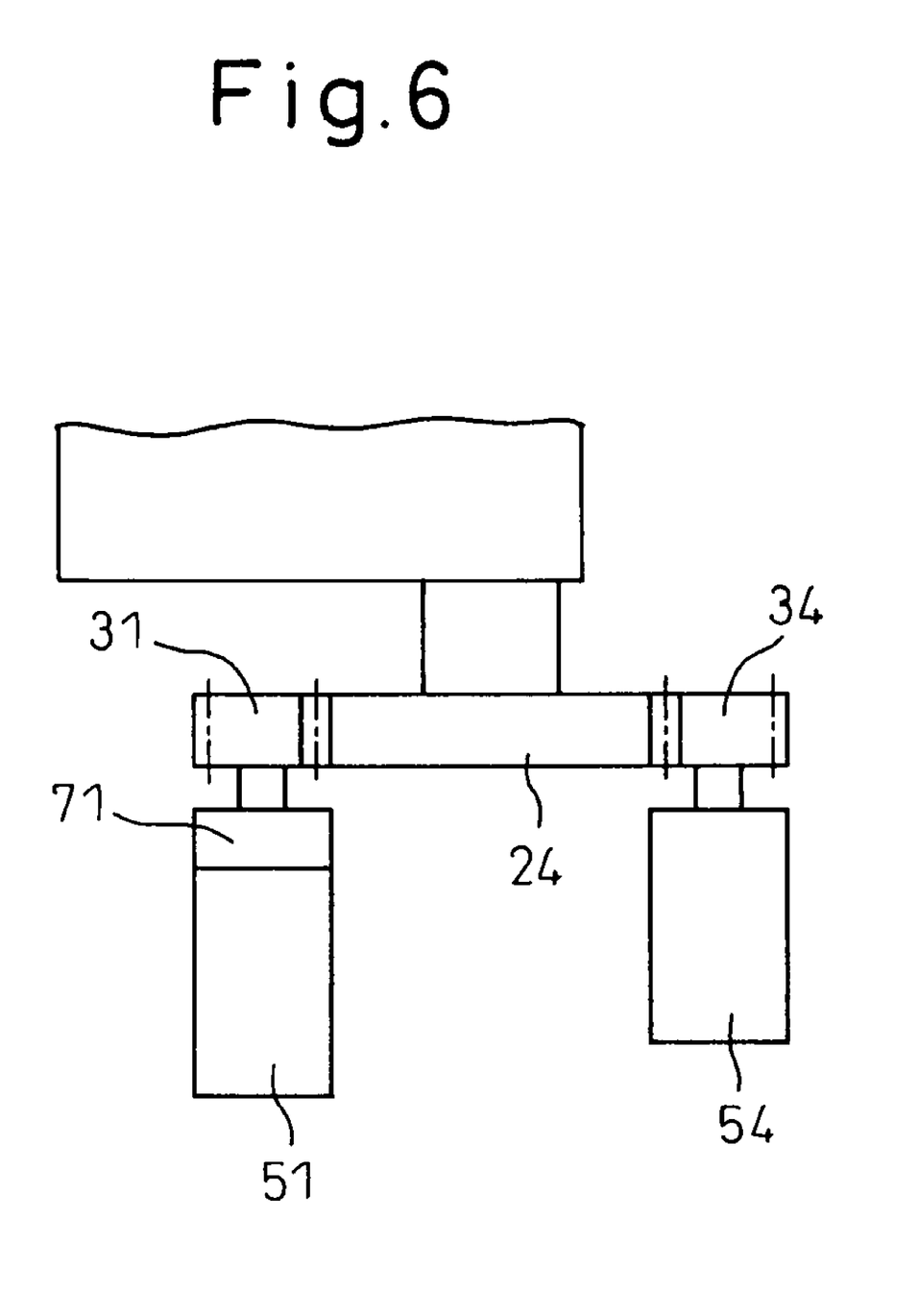
FIG. 6 is a partially enlarged view of a power transmission gear according to another embodiment of the invention.

FIG. 6 is a partly enlarged view of a power transmission gear according to another embodiment of the invention. In FIG. 6, the power transmission gear 24 of the power transmission unit 21 constituting one of the three power transmission units and the motors 51, 54 associated therewith are shown as a representative case.

In FIG. 6, one motor 51 of the two motors 51, 54 has a brake 71 for braking the rotary shaft of the motor 51. The other motor 54 has no such brake. The brake 71 functions to prevent the axial fall of the upper arm 14 under gravitation.

In the case where a single power transmission gear 24 is driven by the two motor gears 31, 34 as shown in FIG. 6, it is desirable that only the motor 51 has the brake 71. Since in the case where both the motors 51, 54 have a brake, an excessive load may be imposed on the power transmission gear 24 due to the difference between the timing at which the brakes are applied. It is possible to avoid this problem by the configuration in which only the motor 51 has the brake 71.

It is also within the scope of the invention in a case in which the robot base 15 has an opening, i.e. a case where the motors 51 to 56 in the robot base 15 are partially or completely exposed. Also, the robot base 15, though arranged on the floor 90 in FIG. 1, may alternatively be arranged on the ceiling (not shown) or on a wall (not shown) between the ceiling (not shown) and the floor 90.

Although two motor gears engage a single power transmission gear according to the embodiments described above with reference to the drawings, three or more motor gears may engage a power transmission gear. In such a case, the three or more motor gears are arranged along the periphery of the power transmission gear.

According to an embodiment not shown, this invention is applicable to an industrial robot having a robot arm of a parallel link structure. Also in the robot arm having the parallel link structure, the spatial three-dimensional position of the forward end of the wrist is determined by the motors for the three power transmission units. By driving each power transmission unit with two motors, the motor torque can have a margin, and an operation at the high-speed and at high-acceleration can be continuously performed.

Further, according to an embodiment not shown, this invention is also applicable to an industrial robot configured of a robot arm having a horizontal multijoint structure. It is apparent that an operation at the high-speed and at high-acceleration can be continuously also performed in this case.

Although the invention is explained above with reference to typical embodiments, it will be understood by those skilled in the art that various other modifications, omissions and additions than those described above can be made without departing from the scope of the invention.

The invention claimed is:

1. An industrial robot comprising:
   a wrist axial portion;
   three basic axial portions for positioning the wrist axial portion in a three-dimensional space; and a
   three drive arrangement for driving the three basic axial portions, respectively;
   wherein all of the motors included in the three drive arrangement are built into the base of the industrial robot,
   wherein the drive arrangement corresponding to at least one of the three basic axial portions includes at least two motors, and
   wherein the drive arrangement corresponding to at least one of the three basic axial portions includes a first motor and a second motor,
   wherein the first motor is controlled by a torque command for the first motor based on the speed of the first motor, and
   wherein the second motor is controlled by the torque command for the first motor.

2. The industrial robot according to claim 1,
   wherein the three drive arrangement each include at least two motors.

3. The industrial robot according to claim 1,
   wherein the three basic axial portions include power transmission gears, respectively, coaxially arranged in an axial direction,
   wherein the motors each have a motor gear for engaging with each of the power transmission gears on the output shaft of the motors, respectively, and
   wherein all of the motor gears are arranged along a periphery of the power transmission gears.

4. The industrial robot according to claim 1,
   wherein only one of the first motor and the second motor has a mechanical brake.

5. The industrial robot according to claim 2,
   wherein the three basic axial portions include power transmission gears, respectively, coaxially arranged in an axial direction,
   wherein the motors each have a motor gear for engaging with each of the power transmission gears on the output shaft of the motors, respectively, and
   wherein all of the motor gears are arranged along a periphery of the power transmission gears.

* * * * *